United States Patent
Inagaki et al.

(10) Patent No.: US 7,176,175 B2
(45) Date of Patent: Feb. 13, 2007

(54) CLEANSING PROCESSING AGENT, CLEANSING METHOD EMPLOYING THE AGENT AND A MOLDED STRUCTURAL MEMBER

(75) Inventors: Yasuhito Inagaki, Kanagawa (JP); Yasutoshi Kawate, Tokyo (JP); Kimiko Ishikawa, Kanagawa (JP); Hiroyuki Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 21 days.

(21) Appl. No.: 10/850,494

(22) Filed: May 20, 2004

(65) Prior Publication Data

US 2004/0220071 A1    Nov. 4, 2004

Related U.S. Application Data

(62) Division of application No. 09/253,048, filed on Feb. 19, 1999.

(30) Foreign Application Priority Data

Feb. 26, 1998    (JP)    .............................. P10-046020

(51) Int. Cl.
  *C11D 3/37*    (2006.01)
  *C08F 12/08*   (2006.01)
  *C08F 22/30*   (2006.01)
  *C08F 36/06*   (2006.01)

(52) U.S. Cl. .................. 510/475; 510/492; 525/333.5; 525/332.2; 525/344; 525/353; 252/175; 210/749

(58) Field of Classification Search ............. 525/333.5, 525/332.2, 344, 353; 252/175; 210/749; 510/475, 492
See application file for complete search history.

(56) References Cited

U.S. PATENT DOCUMENTS

2004/0220071 A1 *  11/2004   Inagaki et al. ............... 510/475

FOREIGN PATENT DOCUMENTS

EP            818420 A1 *    1/1998

* cited by examiner

*Primary Examiner*—Brian P. Mruk
(74) *Attorney, Agent, or Firm*—Sonnenschein Nath & Rosenthal LLP

(57) ABSTRACT

A cleansing processing agent that is able to remove harmful substances contained in a variety of waste materials and a cleansing method are disclosed. Specifically, there is disclosed a cleansing processing agent containing a polymer having at least one of styrene or conjugate diene and acrylonitrile as constituent unit and into which are introduced ionic groups. This cleansing processing agent is contacted with a material for processing containing harmful substances contained in the material for processing for removing the harmful substances. The waste plastics can be used effectively, while a modified product obtained on chemical modification of the plastics is useful for suppressing environmental destruction caused by leakage of the harmful substances contained in the waste materials.

7 Claims, 1 Drawing Sheet

CLEANSING PROCESSING AGENT, CLEANSING METHOD EMPLOYING THE AGENT AND A MOLDED STRUCTURAL MEMBER

CROSS REFERENCES TO RELATED APPLICATION DATA

The present application claims priority to U.S. Application Ser. No. 09/253,048, filed Feb. 19, 1999, and Japanese Application No. P10 046020 filed Feb. 26, 1998, which applications are incorporated herein by reference to the extent permitted by law.

BACKGROUND OF THE INVENTION

1. Field of the Invention

This invention relates to a cleansing processing agent for cleansing harmful substances contained in waste materials, sewage water, exhaust gases or soil, and to a cleansing method.

2. Description of the Related Art

The resins containing styrene and/or conjugated dienes and acrylonitrile may be enumerated by styrene-based resins, such as ABS resins, SAN resins or AAS resins, and by synthetic rubber, such as NBR rubber.

These resins are relatively inexpensive. In particular, the styrene-based resins are excellent in toughness, dimensional stability or workability and hence are prevalently used as resin materials, such as covers or casings of various usages, casings of an electronic equipment or vehicles, or various component parts. The synthetic rubber, on the other hand, are prevalently used in tubes, hoses or as a variety of shock-absorbing materials. Under these circumstances, these materials are expected to be used in more extensive fields of application, while researches into higher added-value products are desired. On the other hand, the products formed of the above materials yield a large quantity of waste materials. Recently, the amount of the waste material tends to be increased, such that there exist increasing needs for effective utilization of waste materials.

Meanwhile, disposal of used-up plastics by incineration or land filling account for a major portion (approximately 90%) of the total amount of disposal, such that only a small fraction of the waste materials are being re-used by melting by heating. This recycling by melting by heating suffers from many problems, such as thermal deterioration, including lowering of the molecular weight, resin oxidation, or mixing of resins containing a variety of coloring agents in need of color matching, such that processing technology or cost present serious problems.

On the other hand, incineration produces toxic gases. Thus, under the present situation, one has to resort to processing by land filling. However, the amount of yielding of waste materials inclusive of waste plastics tends to be increased recently, such that direct disposal thereof by lad filling is inefficient and presents problems in nations in which the site suited for land filling is short. Moreover, environmental destruction by leakage of toxic substance, mainly heavy metals, from the land filling site, that is soil pollution, are attracting attention. These toxic substances induce pollution by mainly heavy metals in the waste materials leaking out with acidic rain.

As discussed above, plastic waste materials are yielded in increased amounts year by year, and attention is directed to effective utilization thereof, while there is also demanded the development of a technology of combatting the environmental pollution due to leakage of the harmful substances on disposal of the waste materials containing plastic waste materials.

SUMMARY OF THE INVENTION

It is therefore an object of the present invention to provide a cleansing processing agent for efficiently removing harmful substances contained in a variety of waste materials and a cleansing method which uses this cleansing agent.

The present inventors have conducted perseverant researches towards overcoming the above-mentioned problems, and found that a product obtained on chemically processing a resin containing acrylonitrile and at least one of styrene and conjugate diene, or waste materials thereof has superior properties as a cleansing processing agent, for example, a processing agent for the waste material.

Specifically, the present invention provides a cleansing processing agent containing a polymer having acrylonitrile and at least one of styrene and conjugate diene as constituent unit and into which are introduced ionic groups.

The present invention also provides a cleansing method including bringing a cleansing processing agent, containing a polymer having acrylonitrile and at least one of styrene and conjugate diene as constituent unit, and into which are introduced ionic groups, into contact with a material to be processed, and adsorbing specific substances contained in the material for removal.

According to the present invention, the waste plastics can be used effectively, while a modified product obtained on chemical modification of the plastics may be used for suppressing environmental destruction otherwise caused by leakage of the harmful substances contained in the waste materials.

DESCRIPTION OF THE PREFERRED EMBODIMENTS

Figure 1:
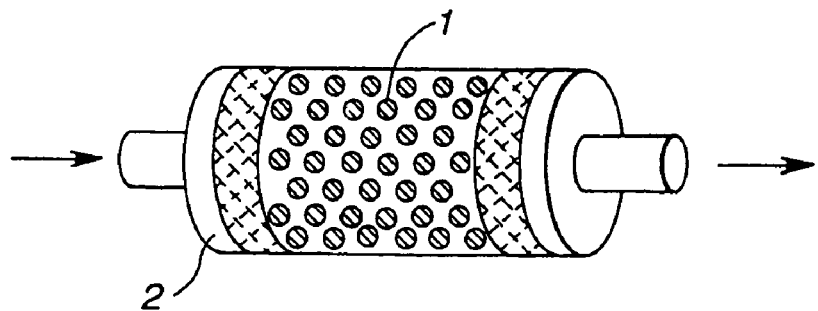
FIG. 1 is a schematic perspective view showing a typical column charged with a cleansing processing agent.
Figure 2:
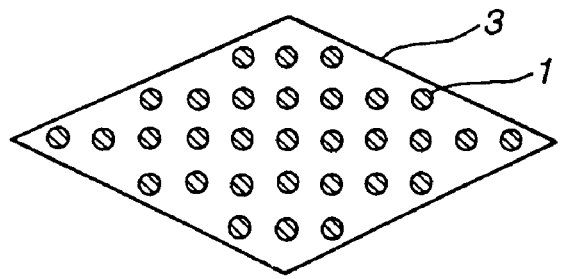
FIG. 2 is a schematic perspective view showing a typical filter admixed with a cleansing processing agent.

The present invention will now be explained in detail. As a high-molecular material containing acrylonitrile and at least one of styrene and conjugate diene (butadiene or isoprene), as a starting material of the cleansing processing agent according to the present invention, preferably contains 20 to 95 mol %, more preferably 40 to 85 mol % and most preferably 50 to 80 mol % of at least one of styrene and conjugate diene in the resin.

If the content is smaller than this range, ion groups, such as sulfonic acid groups, are introduced at a lower rate, thus reducing the number of activated points for ion adsorption crucial as a processing agent for the waste materials. If conversely the content is larger than the above range, the volume of acrylonitrile units is reduced, such that hydrophilic groups, such as amide or carboxylic acid groups, cannot be introduced at a higher rate by acid or alkali treatment. The result is the lowered water permeability and lower rate of adsorption of the processing agent with respect to harmful substances.

The above high-molecular material preferably contains 5 to 80 mol %, more preferably 10 to 60 mol % and most preferably 20 to 50 mol % of acrylonitrile as component unit other than styrene or conjugate diene. By treatment with acid or alkali, the acrylonitrile component unit is converted by hydrolysis into hydrophilic substituents, such as amide or carboxylic acid groups, or ionic substituents, such as carboxylate groups, are introduced on neutralization into the high-molecular material.

This improves hydrophilicity and ionic adscription of the high-molecular material following chemical modification, as discussed above, thus realizing superior properties as the processing agent for the waste materials. Meanwhile, if the content is small, the rate of adsorption with respect to harmful substances (heavy metal ions) is lowered. If conversely the content is excessive, the ratio of styrene and conjugate dienes in the high-molecular material is lowered, with the result that the rate of introduction of the ionic substituents and the effect of adsorption of the processing agent with respect to the harmful substances are lowered, or the high-molecular material becomes hardened and can scarcely be crushed to small pieces.

If styrene, conjugate diene and acrylonitrile is contained in pre-set amounts, other constituent units may be contained in the resin waste materials. These other units may be enumerated by maleic anhydride, itaconic anhydride, α-methyl styrene, acrylamide, methacryl amide, acrylic acids, acrylic acid esters (saturated or unsaturated hydrocarbons with 1 to 100 carbon atoms), methacrylic acids, methacrylic acid esters (saturated or unsaturated hydrocarbons with 1 to 10 carbon atoms), vinyl acetate, vinyl chloride, ethylene, butylene, vinyl pyrrolidone and vinyl pyridine. The molecular weight (Mw) of the high-molecular material is usually 1000 to 20,000,000 or 10,000 to 1,000,000, in terms of the weight average molecular weight. If the molecular weight is lower than this range, the resulting product is water-soluble on chemical processing, such that the desired agent cannot be obtained (that is, cannot be recovered because it is dissolved in water). The molecular weight higher than the above range leads to lowered reaction rate at the time of chemical processing and hence is not practically desirable.

As the high-molecular material containing acrylonitrile and at least one of styrene and conjugate, ABS, SAN, ASA, ACS or AAS resins or a high-molecular material such as NBR rubber, is preferred. These materials may be newly produced virgin pellets, ejected articles from the production process of resin materials or molded products, casings or component materials used in electric appliances or cars, or used-up waste materials obtained on molding for particular usages, such as tubes, hoses or a variety of buffer materials. The site of ejection may be factories, retail stores or households. The products form factories or retail stores are preferred to those from households in that the composition of the materials is more uniform.

The high-molecular material may be alloyed with other resins or waste materials containing additives, such as pigments, dyes, stabilizers, combustion retardants, plasticizers, fillers or assistant agents. Alternatively, the high-molecular material may be mixtures of used waste materials and virgin materials. The other resins that can be mixed with the high-molecular material are preferably those resins which do not obstruct acid processing. These other resins may be enumerated by polyphenylene ether, polycarbonate, polyphenylene sulfide, polyethylene terephthalate, polybutylene terephthalate, polyamide and polyester.

These resins are preferably contained in an amount not larger than 60 wt % with respect to the high-molecular material. If the content of these resins is increased, chemical reactions by acids and/or alkalis is obstructed.

The high-molecular material is preferably comminuted to small pieces prior to chemical processing by the any of the following methods:

(1) pulverization followed by sieving; it being noted that, if the material contains rubber components, pulverization following freeze drying is preferred; or (2) melting on heating followed by pelletizing to small-sized beads. The small pieces of the high-molecular material are preferably of a size not larger than 3.5 mesh. If the size is larger than this value, the reactant surface area is reduced to render chemical processing difficult to lead to protracted reaction time. Moreover, the performance as the waste material processing agent (ionic absorptive performance) is significantly lowered.

In the high-molecular material, inorganic pigments and/or metal powder pigments, such as those given below, are preferably contained. That is, the inorganic pigments are preferably high in dispersibility, and are enumerated by carbon black, iron black, titanium oxide, zinc flower, iron oxide red, ultramarine, berlin blue, cobalt blue, lithopone, zinc sulfide, antimony oxide, yellow iron oxide, amber, sienna, ochre and pyridine. Of these, carbon black and titanium oxide are preferred. The carbon black and titanium oxide, routinely used as reinforcing agent or electrical conductivity according agent besides being used as a coloring agents, are preferred. The carbon black may be manufactured by any of the channel, furnace or thermal methods, alone or in combination. The mean particle size is 5 to 500 µm and preferably 10 to 50 µm. On the other hand, titanium oxide may be any of the rutile, anatase or ultra-fine-sized titanium types, alone or in combination. The mean particle size is 0.01 to 50 µm and preferably 0.05 to 10 µm.

The metal powdered pigments may be enumerated by aluminum powders, brass powders and bronze powders.

The above-enumerated inorganic pigments and/or metal powdered pigments may be contained alone in the high-molecular material singly or in combination. The inorganic pigments and/or metal powdered pigments may be added to the high-molecular materials with a view to preparing the processing agent for the waste materials and/or for other objects, such as coloring, hiding or static-proofing. The amount of addition of the inorganic pigments and/or metal powdered pigments to the high-molecular material is 0.01 to 20 wt % and preferably 0.05 to 10 wt %. If the amount is less than this range, only limited effects with respect to the modification of the high-molecular material are displayed. If conversely the amount of addition is excessive, economic demerits are produced, or the reaction of modification becomes difficult to control. If the above pigments are contained in the high-molecular material, the pigments tend to be detached from the surface of the material at the time of processing with acid and/or alkali, thus producing a porous surface to increase the reaction surface area to accelerate the reaction. This porous surface is softened by the activation of the above reaction. Moreover, the pigments lying in a further recessed portion are detached from the material to further accelerate the reaction.

By the above reason, the reaction of modification of the high-molecular material is accelerated if the above pigments are contained in an optional high-molecular material. Moreover, since the surface of the as-modified high-molecular material is porous up to its recessed portion, the high-molecular material has an increased adsorptive surface area if used as a processing agent for the waste materials, thereby significantly improving the proportion and the rate of adsorption.

According to the present invention, a polymer containing acrylonitrile and at least one of styrene and conjugate diene as constituent units is processed with an acid and/or an alkali for conversion to a processing agent. By this processing, hydrophilic substituents, such as sulfonic acid and/or its salts, carboxylic acid and/or its salts, —OH and/or its salts, —PO(OH)2 and/or its salts, —CH2PO(OH)2 and/or its salts, ionic groups, such as —NO2 or amide groups, are introduced.

By introducing a pre-set amount of the se hydrophilic substituents into the high-molecular material, hydrophilicity with respect to water and adsorptive performance are afforded to the high-molecular material so that the latter is able to exhibit the properties as the cleansing processing agent. Meanwhile, if the high-molecular material is processed with an acid, acidic ionic groups, represented by sulfonic acid, are introduced into styrene or conjugate diene. On the other hand, the acrylonitrile part is hydrolyzed and converted to amide groups and/or carboxylic acid groups.

Also, if the high-molecular material is processed with an alkali, substituents such as hydroxyl or hydroxylates are introduced into conjugate diene part. On the other hand, the acrylonitrile part is hydrolyzed and converted into substituents, such as amide group, carboxylic acid or carboxylates.

The acids used for the above processing are preferably inorganic acids, and may be enumerated by sulfonating agents, such as concentrated sulfuric acid, sulfuric anhydride, fuming sulfuric acid or chlorosulfonic acid, nitric acid, fuming sulfuric acid, phosphoric acid, phosphorus chloride, phosphorus oxide, phosphoric acid or carbonic acid gas. Of these, concentrated sulfuric acid, sulfuric anhydride, fuming sulfuric acid or chlorosulfonic acid are preferred. In particular, concentrated sulfuric acid with a concentration not less than 70 wt % is preferred.

The alkalis used in the above processing may be enumerated by oxides, hydroxides, carbonates, hydrogen carbonates, acetates, sulfates or phosphates, aqueous solutions thereof, ammonia or primary to tertiary amine compounds. Of these alkalis, inorganic materials, in particular alkali metals and alkali metal compounds, are preferred.

These acids and/or alkalis may be used alone or in combination. If used in combination, the acids and/or alkalis may be mixed before use or added sequentially. If the acids and/or alkalis are used as a mixture, acids are preferably mixed only with acids, while alkalis are preferably mixed only with alkalis. For example, the high-molecular material may first be processed with alkalis and subsequently neutralized with alkalis, or may first be processed with concentrated sulfuric acid and subsequently admixed with sulfuric anhydride.

The charging amounts of acids or alkalis used in the present processing is 0.1 to 1000 mols and preferably 10 to 100 mols based on the total monomer unit of the high-molecular material. If the amount of addition is less than this range, hydrophilic groups are introduced into the high-molecular material at a reduced rate to detract from the desirable properties as the processing agent for the waste materials (adsorptive effect for the harmful material). If the amount of addition is larger than the above range, economic and operational demerits are produced. Although the above processing may be carried out in the acid and/or alkali, it may also be carried out in a system employing an organic solvent. Among usable organic solvents, there are C1 to C2 aliphatic halogenated hydrocarbons, preferably 1,2- dichloroethane, chloroform, dichloromethane, 1,1-dichloroethane, alicyclic hydrocarbons, preferably cyclohexane, methyl cyclohexane or cyclopentane, nitromethane, nitrobenzene, sulfur dioxide, 1 to C7 paraffinic hydrocarbons, acetonitrile, carbon disulfide, tetrahydrofuran, tetrahydropyran, 1,2-dimethoxy ethane, acetone, methylethylketone, thiophene, dimethyl sulfoxide, dimethyl formamide and pyrrolidone.

These solvents may be used alone or in combination. There is no particular limitation to the mixing ratio of various solvents. These organic solvents are preferably used in an amount less than 200 times the weight of the high-molecular material. If the amount of addition of the organic solvent is larger than this range, the proportion of the reaction is lowered with economic demerits. The acids or organic solvents, once used in the above processing, may be recovered after the end of the reaction and used directly, or recovered by extraction and distillation and re-used for the reaction.

According to the present invention, the aforementioned high-molecular material is processed with the above enumerated acids and/or alkalis and hydrophilic substituents containing ionic groups are introduced into the high-molecular material for conversion to cleansing processing agents, such as processing agent for the waste materials.

For example, a processing agent for the waste materials containing sulfonic acid groups may be prepared by carrying out the reaction in concentrated sulfuric acid and by washing solid contents obtained on solid/liquid separation to produce a processing agent for the waste materials containing sulfonic acid groups. Also, the high-molecular material in the solvent may be admixed with phosphorus trioxide and the resulting mixture is hydrolyzed to prepare a processing agent for the waste materials containing —PO(OH)2 groups. Alternatively, a processing agent for the waste materials containing —NO2 groups may be prepared by reacting the high-molecular material with a mixed solution of sulfuric acid and nitric acid.

In addition, the high-molecular material may be boiled in an aqueous solution of sodium hydroxide to prepare a processing agent for the waste materials containing carboxylic acid or sodium carboxylate. One or more hydrophilic groups may be introduced into the high-molecular material. For satisfying the properties required of the processing agent for the waste materials, the amount of the ionic groups (ionic groups excluding nitrile and amide groups) contained in the high-molecular material is 5 to 95 mol % and preferably 10 to 70 mol % based on the total unit. If the amount of the ionic groups is larger than this range, the high-molecular material is water-soluble and is unusable as the processing agent for the waste materials. If conversely the amount of the ionic groups is less than the above range, the adsorptive effect of the processing agent with respect to the harmful material (mainly heavy metals) is lowered.

By the above processing, carried out under the following conditions, a pre-set amount of the ionic groups can be introduced into the high-molecular material. The processing reaction temperature, varying significantly depending on whether or not an organic solvent is used, is usually 0 to 200° C. and preferably 30 to 150° C. If the reaction temperature is too low, the reaction speed is too slow and practically not effective while a processing agent for waste materials having satisfactory performance cannot be obtained. If the reaction temperature is too high, molecular chains of the high-molecular material are liable to be ruptured due to thermal decomposition and are soluble in water. The reaction time, which varied significantly with the reaction temperature, is usually 1 minute to 40 hours and preferably 5 minute to 2 hours. If the reaction time is too short, the reaction cannot proceed sufficiently, whereas, if it s too long, the production efficiency is lowered. The reaction product, processed with the alkali, is preferably washed to remove any residual acid or alkali components. For washing the reaction product, washing with a large quantity of water or neutralization with the invert aqueous solution is preferred. The reaction product is first filtered out from the reaction system and injected into a large quantity of water or the invert aqueous solution for washing. If the organic solvent is used, washing may be carried out after distilling the solvent off by heating or the solvent may be distilled off after washing.

The reaction mass obtained by the above processing is gelated and subsequently dried under the sun, heating, depressurization, centrifugation or pressing to produce the targeted cleansing processing agent.

The modified product, obtained as described above, contains ionic groups (hydrophilic groups), such as sulfonic groups or carboxylic groups, in the same material as the starting material, so that it can adsorb the harmful material in the waste materials containing heavy metals, such as ions of Pb, Cd, Cu, Ni, Hg, Cr, Zn or Sn or ammonia or amine compounds effectively, that is efficiently and expeditiously.

The method of using the cleansing processing agent according to the present invention is hereinafter explained.

(1) The inventive processing agent is added to the plant effluent water containing harmful heavy metals, such as Pb, Cd, Cu, Ni, hg or Cr, for adsorbing these metals. After the adsorption, the concentration of the heavy metals in the effluent water is confirmed using an analyzer, a simple water quality test paper or a test liquid. If the control value is met, the effluent water is separated from the solid content by a filter and the processing liquid is discharged into the river. The solid content, that is adsorbed heavy metals, is allowed to dry or dried under the sun and put to incineration or land filling. After incineration, metal components are recovered with e.g., a dilute aqueous solution. For the above processing, flocculants, deodorants or decoloring agents, for example, may also be used.

(2) The inventive processing agent is added to a land filling site. For addition, the processing agent may be distributed in a layer and/or mixed with the waste materials in the course of the land filling. In this case, if the harmful material such as heavy metals are allowed to leak out from the waste materials, the inventive processing agent adsorbs the heavy metals, thus prohibiting the harmful material from being diffused in, for example, the soil outside the waste material disposal site. The inventive processing agent may be used in conjunction with other agents, such as chelating agents or water-absorbent resins.

(3) The inventive cleansing processing agent is mixed at the outset in a molding material, such as metal, plastics, wood, paper, glass or a compound material thereof. This prohibits the harmful material from being diffused into water, soil or atmosphere on discarding the molded material. This using method is desirably adapted to a disposable type product, such as paper diapers or packaging material.

(4) The inventive cleansing processing agent is added during defecation and urination to a toilet bowl or directly to feces or urine. This prevents diffusion of ammoniac smell. The inventive cleansing processing agent may also be added to feces or urine outdoors or to animals. The processing agent may be used in combination with deodorants or disinfectants.

(5) The processing agent of the present invention is added to sewage water, activated sludge or dehydrated cake. This renders it possible to reduce ammoniac smell and to recover heavy metals or amine compounds contained in the waste materials as a solid material (cake). In the above processing, other agents, such as flocculants or discoloring agents may be used in conjunction.

Figure 3:
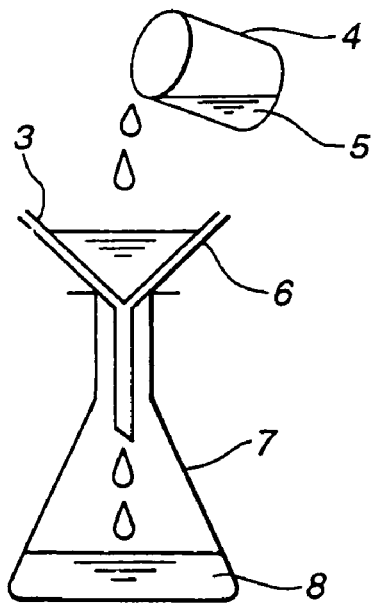
FIG. 3 is a schematic perspective view showing a filtering method by a filter.

(6) A cleansing processing agent of the present invention is charged into a vessel 2 of glass or plastics so as to be used as a removing means (filter or column) of the harmful material contained in the gas or the liquid. Alternatively, the cleansing processing agent 1 of the present invention is mixed into a filter 3 formed of paper or cloth so as to be used as a filter as shown in FIG. 3. If water 5 containing the harmful material in the vessel 4 is filtered by the filter 3 arranged in a funnel 3, purified water 8 can be obtained in a flask 7.

(7) The cleansing processing agent of the present invention is injected into the soil contaminated with harmful materials, such as heavy metals. Alternatively, a layer charged with the cleansing processing agent of the present invention is provided around the contaminated soil to prevent diffusion of the harmful material.

The above method enables the cleansing processing agent of the present invention to be used for processing various waste materials in the liquid, gaseous or solid state.

EXAMPLES

Examples 1 to 4 were prepared as cleansing processing agents, while Comparative Examples 1 and 2 were prepared for comparison sake. The present invention is, however, not limited to these Examples or Comparative Examples.

Preparation Example 1

An ABS resin as a reagent, containing 63 mol % of styrene, 29 mol % of acrylonitrile and 8 mol % of butadiene, as constituent units, was freeze-dried to produce a pulverized product with the size of 16 to 32 mesh. 3 g of the pulverized mass were added to 90 g of concentrated sulfuric acid (90 wt %) and reacted at 100° C. for 20 minutes.

After the end of the reaction, the solid matter in the system was filtered off by a glass filter. After washing with water, the solid matter was dried at 115° C. for two hours in a circulating air drier to give a processing agent for waste materials (Example 1). The amount of sulfonic acid groups in this processing agent for the waste materials (Example 1) account for 52 mol % of the entire monomeric unit.

Preparation Example 2

A used guard panel of an 8 mm cassette tape (transparent portion), formed of a waste material of a SAN resin containing 60 mol % of styrene and 40 mol % of acrylonitrile without containing pigments, was pulverized to give a powdered product having a size of 16 to 32 mesh. 3 g of the powdered product were added to 90 g of concentrated sulfuric acid (96 wt %) and reacted at 60° C. for 30 minutes. The reaction mass was allowed to cool to room temperature and added to with 0.8 g of fuming sulfuric acid (containing 60 wt % of SO3) and reacted further for 30 minutes. After the end of the reaction, the solid mass in the system was filtered, washed with water and dried by a drier for two hours to give a processing agent for waste materials (Example 2). The sulfonic acid groups in the processing agent for waste materials (Example 2) accounted for 40 mol % of the entire monomer units.

Preparation Example 3

A processing agent for waste materials (Example 3) was produced in the same way as in Example 1 except using, as a starting material, a used guard panel of an 8 mm cassette tape (black portion), formed of a waste material of an ABS resin containing 50 mol % of styrene, 38 mol % of acrylonitrile, 12 mol % of butadiene and 1 wt % of carbon black as an inorganic pigment. The sulfonic acid groups in the processing agent for waste materials (Example 3) accounted for 40 mol % of the entire monomer units.

Preparation Example 4

The same SAN resin as that of preparation Example 2 was pulverized to produce a powdered product having the size of 16 to 32 mesh. 3 g of the powdered mass were added to 100 g of a 5 wt % aqueous solution of sodium hydroxide and reacted at 98° C. for two hours. After the end of the reaction, the solid mass in the system was filtered, washed with water and dried by a drier for two hours to give a processing agent for waste materials (Example 4). The sulfonic acid groups in the processing agent for waste materials (Example 4) accounted for 38 mol % of the entire monomer units.

Comparative Example 1

The processing was carried out in the same way as in Example 1 except using, as a starting material, a reagent HIPS resin containing 60 mol % of styrene and 40 mol % of butadiene without containing pigments, to give a comparative sample (Comparative Example 1). The sulfonic acid groups in the processing agent for waste materials (Comparative Example 1) accounted for 9 mol % of the entire monomer units.

Comparative Example 2

The processing was carried out in the same way as in the preparation example 2 except using a used CD casing material (transparent) containing, as constituent units, 100 mol % of styrene, and not containing pigments, to give a comparative sample (Comparative Example 2). The sulfonic acid groups in the processing agent for waste materials (Comparative Example 2) accounted for 7 mol % of the entire monomer units.

Comparative Example 3

A commercial ion exchange resin (trade name: Dowex 1-X8) was prepared as a comparative sample (Comparative Example 3).

Of the above samples (Examples 1 to 4 and Comparative Example 1 to 3), properties as the processing agent for waste materials were evaluated by the following method.

Evaluation 1

Pb, Cu, Ni and Cd ions were dissolved in water to a concentration of 50 ppm to produce 50 ml of respective aqueous solutions, to each of which 0.1 g of the above sample was added and stirred for five minutes. The metal adsorption rates were found by an equation of [(initial concentration—post-processing concentration)/initial concentration]×100 (%). The results are shown in Table 1.

TABLE 1

| metal species | adsorption rate (%) | | | |
| --- | --- | --- | --- | --- |
|  | Pb | Co | Ni | Cd |
| Ex. 1 | >98 | >98 | 98 | >98 |
| Ex. 2 | >98 | >98 | 97 | 95 |
| Ex. 3 | >98 | >98 | >98 | >98 |
| Ex. 4 | 95 | 93 | 92 | 94 |
| Comp. Ex. 1 | 5 | <3 | <3 | 4 |
| Comp. Ex. 2 | <3 | <3 | <3 | <3 |
| Comp. Ex. 3 | <3 | <3 | <3 | <3 |

It is seen from the above results that the processing agent for waste materials prepared in accordance with the present invention effectively adsorb heavy metal ions. If the high-molecular material prior to processing with acid or alkali is not of a predetermined composition, the modified product is drastically lowered in its metal adsorbing properties (see Comparative Examples 1 and 2). Also, since the present processing agent for waste materials is not in need of pre-processing, such as hydrophilizing treatment, simple and prompt effect may be expected t be realized in application.

Evaluation 2

0.1 g each of the respective samples is injected into 50 ml of activated sludge from the sewage processing plant and stirred to compare the odor after lapse of five minutes. It was found that the activated sludges admixed with the samples of Examples 1 to 3 were fully deodorized, while only slight odor was left in Example 4 and Comparative Examples 1 to 3 were scarcely deodorized.

Evaluation 3

0.15 g each of the above samples was added to 20 ml of effluent water from an interconnection process in the semi-conductor manufacture, containing 150 ppm of Cu ions, and stirred for five minutes. The Cu ion concentration was measured using a simple water quality test paper sheet. It was found that addition of Examples 1 to 4 satisfied the water quality standard for sewage water of not more than 3 ppm. On the other hand, the results of a test with water quality test paper sheet indicated that Cu ion concentration was not less than 50 ppm for the Comparative Examples 1 to 3.

As may be seen from the above explanation, harmful substances contained in the waste materials can be efficiently adsorbed for removal.

What is claimed is:

1. A cleansing processing agent containing a polymer having 20 to 50 mol % of acrylonitrile and 50 to 80 mol % of at least one of styrene and conjugate diene as constituent unit and into which are introduced ionic groups,
    wherein,
        said ionic groups are at least one selected from the group consisting of carboxylic acid groups, hydroxy groups, —PO(OH)2 groups, —CH2PO(OH)3 groups, —NO2 groups or salts thereof.

2. The cleansing processing agent according to claim 1 wherein said polymer is at least one selected from the group consisting of an acrylonitrile-butadiene-styrene resin, a styrene-acrylonitrile resin and an acrylonitrile-butadiene rubber.

3. The cleansing processing agent according to claim 1 wherein said polymer contains a pigment.

4. The cleansing processing agent according to claim 1 wherein said polymer is obtained on processing used resin with an acid and/or an alkali.

5. The cleansing processing agent according to claim 1, obtained on mixing the polymer into a starting material composed at least of wood, plastics, paper, glass and metal and molding the resulting mixture.

6. The cleansing processing agent according to claim 1, used as a processing agent for waste materials, an effluent water processing agent, an exhaust gas processing agent or as a soil improvement agent.

7. A structured molded article produced by mixing a polymer having 20 to 95 mol % of acrylonitrile and 50 to 80 mol % of at least one of styrene and conjugate diene as constituent unit and into which are introduced ionic groups into a starting material composed of at least wood, plastics, paper, glass and metal and molding the resulting mixture to a pre-set shape, wherein, said ionic groups are at least one selected from the group consisting of carboxylic acid groups, hydroxy groups, —PO(OH)2 groups, —CH2PO(OH)3 groups, —NO2 groups or salts thereof.

* * * * *